Feb. 21, 1956 K. A. KNUTSEN 2,735,617

PROCESS FOR RECORDING ON A RECORDING CARD OR STRIP

Filed July 16, 1951

INVENTOR
KNUT ANDREAS KNUTSEN
By: Haseltine, Lake & Co.
AGENTS 2,735,617
Patented Feb. 21, 1956

2,735,617

PROCESS FOR RECORDING ON A RECORDING CARD OR STRIP

Knut Andreas Knutsen, Paris, France, assignor to Compagnie des Machines Bull (Societe Anonyme), Paris, France Application July 16, 1951, Serial No. 237,043
Claims priority, application France July 18, 1950
4 Claims. (Cl. 235—61.12)

The present invention relates to processes for recording statistical or accounting data and to carriers of data for carrying these processes into effect. Various recording and the corresponding data carriers have been devised with a view to permitting the manual recording effected by an operator on a card, for example without the aid of the usual stamping or perforating machines.

When data are recorded in the form of marks or characters intended to be analysed by photo-electric means the recording card is provided with locations for recording positions pre-arranged in such manner that the operator can apply thereto either marks or characters corresponding to the value of the data to be recorded.

Unfortunately, it is very difficult, even with trained personnel, to ensure that the marks or characters are always strictly located in the positions provided or formed according to a fixed design, which is however, an indispensible condition for avoiding errors during analysis.

The present invention has for its object to avoid these disadvantages by a recording process which consists in causing the signs representative of data to appear by chemical conversion, these signs being initially placed on the data carriers in a form which is always the same and which may or may not be visible in such manner that it is certain that, once the signs are disclosed, the analysis apparatus will be correctly operated.

One object of the invention is a process for initially placing signs representative of data in the locations of recording positions on a recording card or strip by means of a produce which, in the normal condition, has light reflecting properties very little different from the data carrier but which, as a result of a simple treatment, may acquire reflecting properties very different from the material of the data carrier.

Another object of the invention is a process for recording data by which the signs, marks or charcters representative of the said data are caused to appear in the selected recording locations by means of a simple selective treatment of a product previously applied to the data carrier, this treatment being adapted to give to the said product on the regions treated, reflecting properties different from those of the material of the said data carrier or different from those which it has when not treated.

Another object of the invention is a recording card or strip provided partly or completely, in the locations of the recording positions, with signs representative of data placed by means of a product which, in the normal condition, has light reflecting properties little different from that of the surface of the data carrier, but which, by a suitable treatment, may acquire reflecting properties entirely different from those of the said surface.

Another object of the invention consists of a recording card or strip provided partly or completely, in the locations of the recording positions, with signs representative of data placed by means of a product, which, in the normal condition, is of a colour not adapted to be influenced by a predetermined photo-electric analysis means, but which, at the time of a localised physical or chemical treatment, acquires at the treated zones a colour capable of affecting the said predetermined photo-electric analysis means.

The known photo-electric analysis arrangements are generally provided for the analysis of marks which are distinctly darker than the surface of the cards or for the analysis of marks which are distinctly lighter than the said surface.

In both cases, according to the invention, there is carried out an initial impression of the recording cards. This impression is carried out by means of a machine, preferably an automatic machine, by which a chemical product, the colour of which may be changed by a subsequent treatment, is deposited in the possible recording positions of a card or a part of a card.

Other objects of the present invention will become apparent to those skilled in the art upon the reading of the following detailed description, taken together with the drawings.

Figure 1:
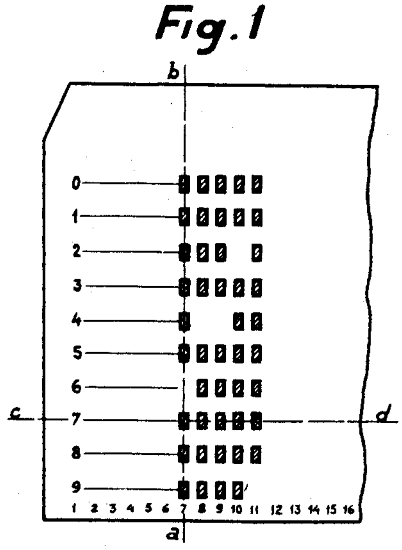
Figure 1 shows one way of registering a datum by changing the colour of the material used for tracing a determined marking.

In Figure 1, the card which is intended to register data receive first rectangular prints at all places where digits can be registered. The rectangular locations of these prints are determined with accuracy by the intersections of rectangular lines such as *ab* and *cd*, which are the axes of the column 7 and the line interval 7 respectively. The prints were made by an automatic machine before any datum registering with a material whose colour stands out against the card. To register the number 64,429, drops of an appropriate liquid reagent are deposited at the convenient locations, making the prints colourless as is shown in the figure. Eventually this discoloration can be produced by heating this material without burning or damaging the card itself. When the colour of the print changes by the action of the reagent, this change must be sufficiently notable to allow of a quick and easy reading by noting the corresponding figures that are plainly printed on both lateral edges of the card, in line with the corresponding marks respectively.

According to a variation of application of the above mentioned method, the material used for making the prints can be normally colourless and can take a definite colour by heat variations or by a chemical action, so as to make the prints sharply visible.

Figure 2:
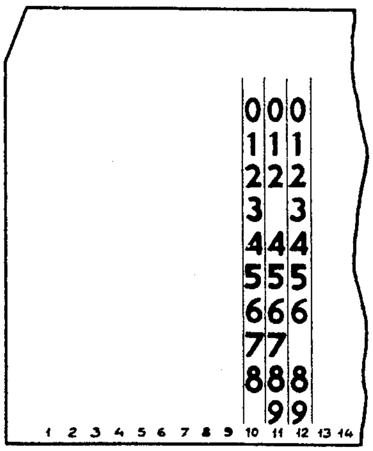
Figure 2 shows a variation of the method of application which is shown in Figure 1.

Figure 2 illustrates the case wherein digits are plainly printed in the card field where data are to be registered. Each digit indicates the value pertaining to the line where it is printed. The action of the reagent, or of heat elevation on the material used to trace the digits 9, 3, 7 in the columns 10, 11, 12 makes it colorless, and the number 937 can be easily read in these columns. The said action can also involve a notable colour change, for example, transform black characters into red ones.

In the case where the recording positions receive, in the recording zone, signs in the form of characters, preferably figures, indicating the values allocated to the different recording positions, the product constituting these signs may in the normal condition be of a color such that these signs can be readily distinguished.

The product for preparing the recording positions may be a chemical compound of the type as "sympathetic ink,"

that is to say, having properties of changing color when it is placed in the presence of a suitable developer. The preparatory product, which may be colourless or slightly coloured in the normal condition, may assume after changing colour, a colour which is distinctly darker than that of the card, for example black. For instance such a product may be a solution at 1% of potassium ferrocyanide $K_4(FeC_6N_6)$ which gives scarcely yellow signs. According to the employed reagent, these signs get different colors, blue with a solution at 1% of a ferric salt (e. g. $FeCl_3$), brown with a solution at 1% of a cupric salt (e. g. $CuCl_2$), red with a solution at 1% of an uranium salt (e. g. $(UO_2)Cl_2$).

Another example may be also given by starch paste, sufficiently watered down, which is colorless and to which iodized water, prepared in the cold state, gives a dark-blue color.

The recording process consists in making the marks or characters representative of a certain value or datum to appear by changing color by applying an appropriate developer to the suitable recording positions. For this purpose, the operator may be provided with an apparatus of the stylograph type containing the said developer and adapted rapidly to deposit the developer on small restricted surfaces. Thus in the above mentioned examples, the developer contained in the stylograph may be a solution of a ferric salt or iodized water according to the product used for the preparatory signs.

This recording process could also be employed on a fixed and more or less automatic machine, but it is obvious that its main advantage is to permit the definite establishment of recording by an operator provided only with simple and light equipment, which is particularly interesting for the collection of marks given by recording or calculating apparatus.

The present invention is also applicable to the case where all the recording positions of a recording zone carry marks or characters which, before the recording operation, are of a color very different from that of the data carrier, for example black marks on a card with a light background. The recording process is related to that for the removal of ink spots.

It consists in applying to the selected recording positions a colour-removing product which causes the marks or characters to which it is applied to disappear, giving to the places treated a color practically the same as that of the data carrier but in any case much lighter than that of the untreated marks or characters.

It would also be possible to employ, for the preparation of the recording positions of the data carriers, a product having properties of changing color under the action of a physical agent such as heat, like an aqueous solution of cobalt chloride $CoCl_2+5H_2O$ which is slightly pink and becomes blue by heating but the necessity of having one or more heating elements would lead to a certain complication of the recording equipment.

Figure 3:
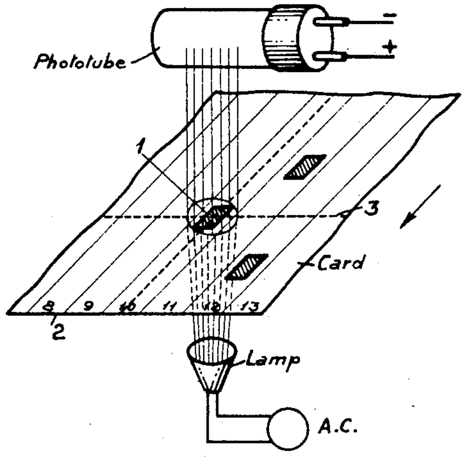
Figure 3 shows one way of detecting a datum by using the influence of colour variation on the photo-electric effect in a photo-tube.

Figure 3 shows schematically one way of using photo-electric means to analyze a tabulating card with the method of the present invention. In this example the screening effect produced by the rectangular print 1 on the card on the light beam emitted by the lamp produces an electrical impulse at the terminals of the photo-tube, when the card is translated past this tube with a sufficient speed. It is to be mentioned that it is not necessary to use a transparent card; an ordinary card, i. e. a card ordinarily used in statistical machines that is the blank cards used in the perforated card controlled machines, is translucent enough to be employed in such a sensing device like the one described in Figure 3. The time elapsed from the passage of the card edge 2 straight above the lamp to that of the axis 3 of the print 1, passage which corresponds to a pulse production, is made to correspond to the detection of a given digit or character by well-known means not represented. All markings but those to be registered are colourless and the print 1 has been coloured by the action of a reagent or by heat elevation.

Figure 4:
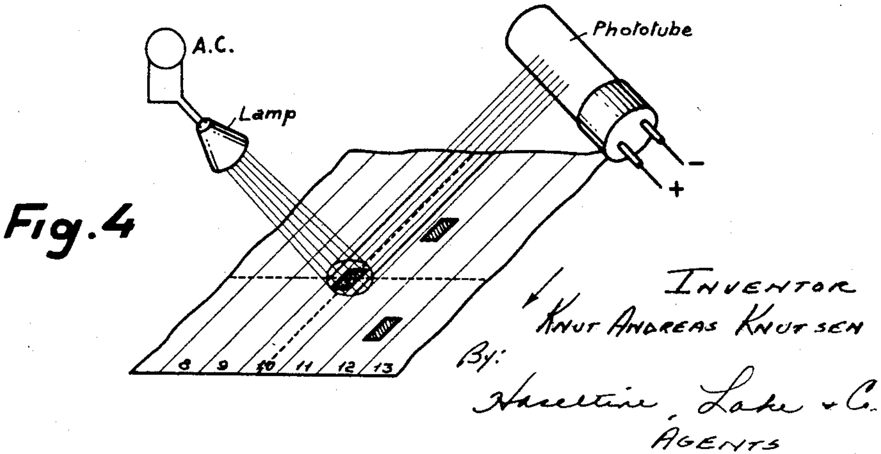
Figure 4 shows a variation of the method of photo-electric detection which is applied in Figure 3.

Figure 4 shows a variation of the photo-electric method of registering data on cards, wherein the light beam produced by the lamp is projected on the card and received by a photo-tube after reflection on said card. The reflecting properties of the printing material applied at convenient locations previous to any inscription of data, are notably changed when this inscription takes place by making a convenient reagent act on the material.

This change in light reflectivity can eventually be also secured by local heating of the prints.

Certain photo-electric analysis arrangements may be adapted, either by the nature of the photo-electric cells themselves or by means of coloured filters, to be sensitive to certain colors. The discrimination of the distinctive marks is then no longer a function of the intensity of the colour or reflecting qualities but only a function of color differences. In this case, the recording positions may be localised by a product which, in the normal condition, has a certain color and which, after the colour-changing treatment, has a colour different from the first. For example, red and blue, corresponding to very different wave lengths would be particularly suitable.

I claim:

1. In the art of producing permanent records on record cards having each a plurality of discrete index-point positions disposed according to columns and numbered lines, the method which comprises the steps of apposing on all of said plurality of index-point positions of a card a first predetermined material with optical properties similar to those of the card material to form characters substantially invisible on said card, and of then apposing on one or more selected index-point positions a second material which chemically reacts on said first material to form visible characters representative of a to be recorded datum by their positions and forms.

2. In the art of producing permanent records on record cards having each a plurality of discrete index-point positions delineated by preprinted lines disposed in columns and numbered rows, the method which consists in apposing on all of said plurality of index-point positions of a card a first predetermined material with a color similar to that of the card material to form discrete marks substantially invisible on said card, and in then apposing on one or more selected index-point positions a second material capable of chemically reacting upon said first material to form visible marks representative of a to be recorded datum by their positions.

3. In the art of producing permanent records on record cards having each a plurality of discrete index-point positions disposed according to columns and lines, the method which comprises the steps of apposing on all of said plurality of index-point positions of a card a first predetermined material with optical properties different from those of the card material to form clearly visible characters on said card and of apposing on one or more selected index-point positions a second material which is appropriate to change the characters of the said selected index-point positions into corresponding record elements by giving them a color substantially non-distinguishable from that of the card.

4. In the art of producing permanent records on record cards having each a plurality of discrete index-point positions delineated by preprinted lines disposed in columns and numbered rows, the method which consists in apposing on all of said plurality of index-point positions of a card a first predetermined material normally with a color clearly distinguishable from that of the card material to form visible location marks on said card, and in apposing on one or more selected index-point positions a second material which is appropriate to change the location marks of the said selected index-point positions into corresponding record elements by giving them a color substantially non-distinguishable from that of the card.

References Cited in the file of this patent

UNITED STATES PATENTS

| | | |
|---|---|---|
| 699,784 | Brooks | May 13, 1902 |
| 1,514,222 | Murray | Nov. 4, 1924 |
| 2,038,486 | Glas | Apr. 21, 1936 |
| 2,294,679 | Maul | Sept. 1, 1942 |
| 2,493,848 | Ayres | Jan. 10, 1950 |
| 2,508,953 | Knutsen | May 23, 1950 |
| 2,634,677 | Klimkowski | Apr. 14, 1953 |